US012605897B2

(12) United States Patent
Lin et al.

(10) Patent No.: US 12,605,897 B2
(45) Date of Patent: Apr. 21, 2026

(54) METHOD FOR PRODUCING AN AT LEAST PARTIALLY COATED OBJECT

(71) Applicant: Stratasys, Inc., Minnetonka, MN (US)

(72) Inventors: Fei Lin, Shanghai (CN); Yifang Wang, Shanghai (CN); Jie Qiao, Shanghai (CN); Chenxi Zhang, Shanghai (CN)

(73) Assignee: Stratasys, Inc., Minnetonka, MN (US)

( * ) Notice: Subject to any disclaimer, the term of this patent is extended or adjusted under 35 U.S.C. 154(b) by 32 days.

(21) Appl. No.: 18/288,285

(22) PCT Filed: Apr. 25, 2022

(86) PCT No.: PCT/EP2022/060864
§ 371 (c)(1),
(2) Date: Oct. 25, 2023

(87) PCT Pub. No.: WO2022/229081
PCT Pub. Date: Nov. 3, 2022

(65) Prior Publication Data
US 2024/0208144 A1 Jun. 27, 2024

(30) Foreign Application Priority Data

Apr. 26, 2021 (CN) .......................... 202110456602.8
Jun. 7, 2021 (EP) ................................. 21177999.6

(51) Int. Cl.
| | |
|---|---|
| *B29C 64/30* | (2017.01) |
| *B29C 64/153* | (2017.01) |
| *B29C 64/268* | (2017.01) |
| *B29K 75/00* | (2006.01) |
| *B33Y 10/00* | (2015.01) |
| *B33Y 40/20* | (2020.01) |
| *B33Y 70/00* | (2020.01) |

(52) U.S. Cl.
CPC ............ *B29C 64/30* (2017.08); *B29C 64/153* (2017.08); *B29C 64/268* (2017.08); *B29K 2075/00* (2013.01); *B33Y 10/00* (2014.12); *B33Y 40/20* (2020.01); *B33Y 70/00* (2014.12)

(58) Field of Classification Search
CPC .................................................... B29C 64/30
See application file for complete search history.

(56) References Cited

U.S. PATENT DOCUMENTS

| | | | | |
|---|---|---|---|---|
| 5,670,600 | A * | 9/1997 | Nienhaus | ........... C09D 133/066 |
| | | | | 524/502 |
| 2009/0270581 | A1* | 10/2009 | Tielemans | ........... C09D 175/16 |
| | | | | 560/155 |
| 2019/0375153 | A1 | 12/2019 | Achten et al. | |
| 2020/0306829 | A1 | 10/2020 | Achten et al. | |
| 2021/0252778 | A1* | 8/2021 | Achten | ................ C08G 18/755 |
| 2021/0354376 | A1* | 11/2021 | Achten | ................ B29C 64/165 |

FOREIGN PATENT DOCUMENTS

| | | |
|---|---|---|
| CA | 3107856 A1 | 5/2020 |
| CN | 106584857 A | 4/2017 |
| CN | 106739024 A | 5/2017 |
| CN | 107650375 A | 2/2018 |
| CN | 107962771 A | 4/2018 |
| CN | 109963898 B | 7/2022 |
| WO | 2016030490 A | 3/2016 |

OTHER PUBLICATIONS

International Search Report and Written Opinion, ISA/EP, PCT/EP2022/060864, Jul. 28, 2022, 11 pages.

* cited by examiner

*Primary Examiner* — Timothy Kennedy
(74) *Attorney, Agent, or Firm* — Faegre Drinker Biddle & Reath LLP

(57) ABSTRACT

The present invention relates to a method for producing an at least partially coated object and to an at least partially coated object obtained by the method. The method comprises bringing the object completely or partly into contact with a treating agent; leaving the object at 10° C.-30° C. and 100 mbar-800 mbar for 3-10 minutes; and heat-treating the object at a temperature of 70° C.-90° C. after returning to normal pressure; wherein the object is produced from a construction material by means of an additive manufacturing method, and the construction material comprises a thermoplastic polyurethane; and wherein the treating agent comprises an aqueous polyurethane dispersion and a water-dispersible polyisocyanate, and the viscosity of the treating agent is 100 mPa·s-550 mPa·s, measured under the condition of spindle L 2/30 rpm according to standard DIN 53019; and wherein the amount of the solid constituent of the aqueous polyurethane dispersion is 36% by weight to 70% by weight, and the amount of the solid constituent of the water-dispersible polyisocyanate is 4% by weight to 8% by weight, relative to the total weight of the treating agent, wherein the terms "normal pressure" and "solid constituent" are defined as specified in the description. The at least partially coated object of the present invention has good mechanical properties and good surface effect.

10 Claims, No Drawings

1

METHOD FOR PRODUCING AN AT LEAST PARTIALLY COATED OBJECT

CROSS-REFERENCE TO RELATED APPLICATIONS

This application is a U.S. National Phase of International Application No. PCT/EP2022/060864 filed Apr. 25, 2022, which claims priority to and the benefit of European Application No. 21177999.6, filed Jun. 7, 2021 and Chinese Application No. 20211046602.8, filed Apr. 26, 2021, the disclosures of which are incorporated herein in their entirety.

TECHNICAL FIELD

The present invention relates to a method for producing an at least partially coated object and to an at least partially coated object obtained by the method.

PRIOR ART

Additive manufacturing method is also known as 3D printing method ("3D printing"). It is known that the plastic object is manufactured by additive manufacturing method, such as fused filament fabrication (FFF) or powder sintering method, in which the plastic object is constructed layer by layer. The powder sintering method, for example the powder bed fusion method, is a method for constructing objects layer by layer by using thermoplastic powder. In this case, a thin powder layer is applied by a so-called coating machine and then selectively melted by means of an energy source. Here, the geometry of the part is supported by the surrounding powder. As a result, complex geometry can be manufactured more economically than that in fused filament fabrication. In addition, different objects can be closely arranged or manufactured in a so-called powder bed. Due to these advantages, the powder bed fusion method is an additive manufacturing method that can be carried out on a large scale, which is used by industrial users. The powder bed fusion method may include laser sintering (SLS, selective laser sintering) and high-speed sintering (HSS, jet fusion). They are different from each other in the method of introducing energy for selective fusion into the plastic. In the laser sintering method, energy is introduced by a deflected laser beam. In the high-speed sintering method, energy is introduced by combining the infrared (IR) radiator with IR absorbers that are selectively printed in the powder bed.

The construction material used in the powder bed fusion additive manufacturing method may be, for example, polyamide powder or thermoplastic polyurethane powder. The disadvantages of using such plastic powder, especially thermoplastic polyurethane powder, are that the surface of the printed object is rough and porous, which will reduce material properties; and that the rough surface will increase wear; and that the porosity makes it easy for contaminants to adhere to and remain on the surface of the object, which makes the object unsightly; and that the porosity may also have a negative impact on the tactile sense; in addition, that the object may absorb moisture, which affects its structure and stability.

In order to reduce the roughness and porosity of the surface of the object, a method known in the prior art is to grind and/or polish the surface thereof. Although the surface of the plastic object can be made smoother, the pores cannot be effectively eliminated. Also, it cannot be ensured that no contaminants adhere to the surface of the object. Due to its flexibility and elasticity, it is difficult to physically grind and/or polish the thermoplastic polyurethane powder. Polishing of the surface of the object is not feasible in all situations. Since the material will be abraded from the surface of the object during polishing, the geometry of the object may be changed, which is undesirable in some applications. Moreover, in practical applications, it is usually desired that the surface of the object is water-proof or water-impermeable. However, polishing the surface of the object cannot ensure that it is fluid-proof, especially water-proof and water-impermeable.

In the prior art, organic solvents are also used to treat a porous surface. This treatment method is to corrode the surface of an object with an organic solvent, so as to eliminate porosity and make the surface of the object smooth. However, the corrosion treatment of the surface of the object with an organic solvent may change the geometry, such as reducing the thickness of the object, thereby lowering the performance of the object. Moreover, the organic solvent used in the treatment process is usually a strong polar solvent of high boiling point, such as dimethyl formamide (DMF), which usually takes a long time to be removed at a high temperature or under vacuum. Therefore, it should be avoided from a view of environmental protection.

WO 2016/030490 A1 discloses a method for impregnating a molded article, which is manufactured by a 3D printing method, especially a powder-based manufacturing and/or printing method, with a liquid and/or a sprayable impregnating agent, wherein the impregnating agent comprises 25 to 95% by weight of a solvent or a solvent mixture and a proportion supplemented to 100% by weight of a plastic or a plastic mixture soluble in the solvent or the solvent mixture, each based on the entire composition of the impregnating agent, and wherein the impregnating agent is applied to the surface of the molded article to be impregnated, and the impregnated surface is dried after the impregnating agent is applied. However, the disadvantage here is the use of solvents, which should be avoided from a view of environmental protection.

CN 109963898 A discloses a method for impregnating a 3D printed object with an aqueous polyurethane dispersion (PUD). Under normal temperature and pressure, the printed object is impregnated into different aqueous dispersions for a period of time, and then taken out for thermal drying to remove moisture. This method for impregnating can effectively improve the surface roughness of the printed object, and the treating agent used is aqueous and is environmentally friendly. However, this treatment method is only limited to the surface. The penetration of the aqueous polyurethane into the printed object is limited. The improvement of performance of the printed object is also limited.

CN 107962771 A discloses a method for creating a composite product, comprising creating a three-dimensional virtual model of the product; dividing the virtual model into a plurality of adjacent two-dimensional layers; loading the divided virtual model into a three-dimensional printing device that is operable for creating a three-dimensional product from thermosetting polymer resin materials; impregnating the three-dimensional product with a reinforcing material; and heat-treating the impregnated three-dimensional product.

CN107650375 A discloses a method for impregnating a sintered model resin, comprising the following steps: preparing a sintered resin model and an impregnating agent separately; impregnating the sintered resin model into the impregnating agent under an absolute pressure of no more than 40 KPa, wherein the liquid level of the impregnating agent is at least 20 mm higher than the surface of the sintered resin model; impregnating the sintered resin model into the impregnating agent under an absolute pressure of not less than 150 KPa; drying, curing and final treating the sintered resin model, after the impregnation is completed. The impregnating agent is prepared by mixing an epoxy resin, an amine curing agent and an active diluent.

CN 106584857 A discloses a device for impregnating 3D printed polystyrene parts with resin under vacuum, comprising a vacuum box, a container for storing resin, a vacuum pump, a sensor and a control system. The container for storing resin is placed in the vacuum box, and the 3D printed polystyrene part is placed in the container for storing resin. The vacuum pump and the sensor are connected to the vacuum box by means of hoses. The sensor is used to measure the degree of vacuum in the vacuum box. The control system is connected to the sensor and the vacuum pump via lines. The resin in the container for storing resin is prepared by uniformly blending epoxy resin E51 and polyetheramine in a mass ratio of 3:1.

CN 106739024 A discloses a method for strengthening a 3D printed molded part. The 3D printed molded part is placed in a container containing a liquid thermosetting resin. The container is placed under vacuum. A reinforced 3D molded part is obtained upon curing. The thermosetting resin is an epoxy resin/imidazole system.

In the industry, it is desired to develop an environmentally friendly method that can improve the mechanical properties and the surface effect of the additive manufactured objects.

SUMMARY OF THE INVENTION

The goal of the present invention is to provide a method for producing an at least partially coated object and to an at least partially coated object obtained by the method.

The method for producing an at least partially coated object according to the present invention comprises bringing the object completely or partly into contact with a treating agent;

leaving the object at 10° C.-30° C. and 100 mbar-800 mbar for 3-10 minutes; and heat-treating the object at a temperature of 70° C.-90° C. after returning to normal pressure;

wherein the object is produced from a construction material by means of an additive manufacturing method, and the construction material comprises a thermoplastic polyurethane; and wherein the treating agent comprises an aqueous polyurethane dispersion and a water-dispersible polyisocyanate, and the viscosity of the treating agent is 100 mPa·s-550 mPa·s, measured under the condition of spindle L 2/30 rpm according to standard DIN 53019; and wherein the amount of the solid constituent of the aqueous polyurethane dispersion is 36% by weight to 70% by weight, and the amount of the solid constituent of the water-dispersible polyisocyanate is 4% by weight to 8% by weight, relative to the total weight of the treating agent, wherein the terms "normal pressure" and "solid constituent" are defined as specified below.

According to one aspect of the present invention, an at least partially coated object is provided, which is obtained by the method according to the present invention.

A negative pressure environment suitable in the step of the method for producing an at least partially coated object can make the treating agent easily penetrate into the inside of the object, slow down the volatilization of water from the treating agent, and form a uniform film of the treating agent, thereby improving surface effect of the coated object, and enhancing the tensile strength and elongation at break thereof.

A heat treating temperature suitable in the step of the method for producing an at least partially coated object can promote the activation of the aqueous polyurethane dispersion in the treating agent and improve the adhesion of the aqueous polyurethane dispersion to the surface of the object. A suitable heat treating temperature can also induce and accelerate the chemical reaction between the aqueous polyurethane dispersion and the water-dispersible polyisocyanate in the treating agent, and improve the mechanical properties of the coated object. A suitable heat treating temperature can also prevent the moisture in the treating agent from evaporating too quickly, thereby reducing blinsters on the surface of the object, and improving the appearance of the coated object.

The treating agent used in the present invention is aqueous and is environmentally friendly.

The object produced by an additive manufacturing method can be surface-treated by the method for producing an at least partially coated object of the present invention, such that the mechanical properties such as tensile strength and elongation at break, and the surface effect of the object are improved.

EMBODIMENTS

The present invention provides a method for producing an at least partially coated object, comprising bringing the object completely or partly into contact with a treating agent; leaving the object at 10° C.-30° C. and 100 mbar-800 mbar for 3-10 minutes; and heat-treating the object at a temperature of 70° C.-90° C. after returning to normal pressure; wherein the object is produced from a construction material by means of an additive manufacturing method, and the construction material comprises a thermoplastic polyurethane; and wherein the treating agent comprises an aqueous polyurethane dispersion and a water-dispersible polyisocyanate, and the viscosity of the treating agent is 100 mPa·s-550 mPa·s, measured under the condition of spindle L 2/30 rpm according to standard DIN 53019; and wherein the amount of the solid constituent of the aqueous polyurethane dispersion is 36% by weight to 70% by weight, and the amount of the solid constituent of the water-dispersible polyisocyanate is 4% by weight to 8% by weight, relative to the total weight of the treating agent, wherein the terms "normal pressure" and "solid constituent" are defined as specified below. The present invention also provides an at least partially coated object obtained by the method.

The term "aqueous polyurethane dispersion" as used herein refers to aqueous polyurethane urea dispersion and/or aqueous polyurethane polyurea dispersion and/or aqueous polyurea dispersion and/or aqueous polythiourethane dispersion.

The term "normal pressure" as used herein refers to 1 standard atmospheric pressure.

The term "solid constituent" as used herein refers to solids or effective constituent.

A method for producing an at least partially coated object, comprising bringing the object completely or partly into contact with a treating agent; leaving the object at 10° C.-30° C. and 100 mbar-800 mbar for 3-10 minutes; returning to normal pressure and taking out the object from treating agent; and heat-treating the object at a temperature of 70° C.-90° C.; wherein the object is produced from a construction material by means of an additive manufacturing method, and the construction material comprises a thermoplastic polyurethane; and wherein the treating agent comprises an aqueous polyurethane dispersion and a water-dispersible polyisocyanate, and the viscosity of the treating agent is 100 mPa·s-550 mPa·s, measured under the condition of spindle L 2/30 rpm according to standard DIN 53019; and wherein the amount of the solid constituent of the aqueous polyurethane dispersion is 36% by weight to 70% by weight, and the amount of the solid constituent of the water-dispersible polyisocyanate is 4% by weight to 8% by weight, relative to the total weight of the treating agent, wherein the terms "normal pressure" and "solid constituent" are defined as specified above.

Additive Manufacturing Method

The additive manufacturing method is preferably powder bed fusion method, and most preferably selective laser sintering method.

Construction Material

The thermoplastic polyurethane is preferably elastic thermoplastic polyurethane.

The thermoplastic polyurethane is preferably in a form of powder.

The thermoplastic polyurethane has preferably at least one of the following characteristics:

elongation at break of more than or equal to 50%, measured in the tensile test according to DIN 53504; and compression set of less than or equal to 10% as the absolute value after 25% compression (according to DIN 53517).

The glass transition temperature of the thermoplastic polyurethane is preferably −20° C. to −10° C., measured according to ISO6721-1.

The melt volume rate of the thermoplastic polyurethane is preferably 10 cm$^3$/min to 30 cm$^3$/min, measured under test condition of MVR 190° C./2.16 kg according to ISO1133.

The construction material preferably further comprises an additive.

The additive is preferably one or more of fillers and stabilizers.

The additive is in an amount of 0.1% by weight to 70% by weight, most preferably 1% by weight to 30% by weight, relative to the total weight of the construction material.

Treating Agent

In the method according to the present invention, the object may be completely or at least partially brought into contact with the treating agent after its manufacture.

The bringing into contact may be carried out by impregnating, painting, spraying or other application methods known for aqueous dispersions. The drying of the object after the step of bringing into contact may be carried out, for example, at room temperature (20° C.), at an elevated temperature, and optionally with vacuum assistance. The water in the treating agent is removed by the drying.

The organic solvent in the treating agent is in an amount of not more than 1.0% by weight, based on the total weight of the treating agent.

Most preferably, the treating agent comprises no organic solvent.

The viscosity of the treating agent is 100 mPa·s to 550 mPa·s, measured under the condition of spindle L 2/30 rpm according to the standard DIN 53019.

A suitable viscosity of the treating agent not only facilitates the impregnation of the object into the treating agent, but also reduces the residue of the treating agent on the surface of the object. The film formed by the treating agent can effectively cover the surface of the object. Therefore, the suitable viscosity of the treating agent can improve the surface appearance of the object, and enhance the mechanical properties thereof.

The treating agent may further comprise an additive. The additive is preferably a surface active additive containing a water-soluble siloxane, such as BYK345 and BYK346, in order to promote wetting and coating of the surface of the object with the aqueous polyurethane dispersion. The additive is in an amount of 0% by weight to 1% by weight, based on the total weight of the treating agent.

Aqueous Polyurethane Dispersion

The aqueous polyurethane dispersion preferably comprises polyurethane polymer particles dispersed in the aqueous phase. Such dispersion is also called one component or 1K dispersion. By drying the dispersion, coalescence of the particles and thus film formation can be achieved.

All known aqueous polyurethane dispersions may be used in the aqueous polyurethane dispersion of the present invention, which can be preferably one or more of anionic aqueous polyurethane dispersions and non-ionic aqueous polyurethane dispersions, and most preferably anionic aqueous polyurethane dispersions.

The amount of the solid constituent of the aqueous polyurethane dispersion is preferably 38% by weight to 60% by weight, relative to the total weight of the treating agent, wherein the term "solid constituent" is defined as specified above.

The anionic aqueous polyurethane dispersion comprises hydrophilic anionic groups. The amount of the hydrophilic anionic groups is preferably 0.1 meq/100 g polyurethane polymer to 15 meq/100 g polyurethane polymer, most preferably 1.6 meq/100 g polyurethane polymer to 14 meq/100 g polyurethane polymer.

The aqueous polyurethane dispersion may be added in the form of a dispersion, or may be added in the form of a solid polyurethane polymer and water, which are then mixed, and most preferably be added directly in the form of a dispersion.

The acid value of the aqueous polyurethane dispersion is preferably 0.5 mg KOH/g to 10 mg KOH/g, most preferably 0.5 mg KOH/g to 5 mg KOH/g.

The fusion enthalpy of the polyurethane polymer of the aqueous polyurethane dispersion at 20° C.-100° C. is preferably greater than 3 J/g, most preferably 20 J/g-100 J/g, obtained by measuring the first heating curve by DSC at a heating rate of 20 K/min according to DIN65467.

The residual content of the organic solvent in the aqueous polyurethane dispersion is preferably less than 1.0% by weight, relative to the total weight of the aqueous polyurethane dispersion.

The solid content of the aqueous polyurethane dispersion is preferably 10% by weight to 70% by weight, most preferably 50% by weight to 65% by weight, relative to the total weight of the aqueous polyurethane dispersion.

Preferably, the aqueous polyurethane dispersion is obtained by means of a. preparing an isocyanate-functional prepolymer A) by the reaction of the components comprising A1) an organic polyisocyanate, A2) a polymeric polyol with a number average molecular weight of 400 g/mol-8000 g/mol and a hydroxyl functionality of 1.5-6, A3) optionally a hydroxyl-functional compound with a molecular weight of 62 g/mol-399 g/mol, and optionally an ethylenically unsaturated compound, and A4) optionally an isocyanate-reactive hydrophilizing agent selected from one or more of anionic hydrophilizing agents, potentially anionic hydrophilizing agents and non-ionic hydrophilizing agents;

b. reacting the free isocyanate groups of the isocyanate-functional prepolymer A) completely or partly with the isocyanate-reactive component B) comprising B1) an amino-functional anionic or potentially anionic hydrophilizing agent and B2) optionally an amino-functional compound with a molecular weight of 32 g/mol-400 g/mol to obtain a polyurethane polymer; and c. introducing water before, during or after step b.

The number average molecular weight of the polymeric polyol is preferably 400 g/mol-6000 g/mol, and most preferably 600 g/mol-3000 g/mol.

The hydroxyl functionality of the polymeric polyol is preferably 1.8-3, most preferably 1.9-2.1.

Most preferably, water is introduced after step b.

The solvent still present in the aqueous polyurethane dispersion after dispersing may be removed by distillation. The organic solvent may also be removed during dispersing.

In a preferred embodiment for preparing the aqueous polyurethane dispersion, components A1) to A4) and B1) to B2) are used in the following amounts, where the sum of each amount is 100% by weight:

5% by weight to 40% by weight of component A1),
55% by weight to 90% by weight of A2),
0.5% by weight to 20% by weight of components A3) and B2),
0.1% by weight to 25% by weight of components A4) and B1), wherein the anionic hydrophilizing agent or potentially anionic hydrophilizing agent from A4) and/or B1) is used in an amount of 0.1% by weight to 5% by weight, relative to the total weight of components A1) to A4) and B1) to B2).

In another preferred embodiment for preparing the aqueous polyurethane dispersion, components A1) to A4) and B1) to B2) are used in the following amounts, where the sum of each amount is 100% by weight:

5% by weight to 35% by weight of component A1),
60% by weight to 90% by weight of A2),
0.5% by weight to 15% by weight of components A3) and B2),
0.1% by weight to 15% by weight of components A4) and B1), wherein the anionic hydrophilizing agent or potentially anionic hydrophilizing agent from A4) and/or B1) is used in an amount of 0.2% by weight to 4% by weight, relative to the total weight of components A1) to A4) and B1) to B2).

In still another preferred embodiment for preparing the aqueous polyurethane dispersion, components A1) to A4) and B1) to B2) are used in the following amounts, where the sum of each amount is 100% by weight:

10% by weight to 30% by weight of component A1),
65% by weight to 85% by weight of A2),
0.5% by weight to 14% by weight of components A3) and B2),
0.1% by weight to 13.5% by weight of components A4) and B1), wherein the anionic hydrophilizing agent or potentially anionic hydrophilizing agent from A4) and/or B1) is used in an amount of 0.5% by weight to 3.0% by weight, relative to the total weight of components A1) to A4) and B1) to B2).

The ratio of the isocyanate groups in the organic polyisocyanate of component A1) to the isocyanate-reactive groups such as amino, hydroxyl or thiol group in the components A2)-A4) is preferably 1.05-3.5, more preferably 1.2-3.0, and most preferably 1.3-2.5.

The organic polyisocyanate of component A1) is preferably one or more of polyisocyanates with isocyanate functionality of 2 and polyisocyanates with more than 2 isocyanate groups (NCO) per molecule.

The polyisocyanate with isocyanate functionality of 2 is preferably one or more of 1,4-butylene diisocyanate, 1,6-hexylene diisocyanate (HDI), isophorone diisocyanate (IPDI), 2,2,4-trimethyl-hexamethylene diisocyanate, 2,4,4-trimethyl-hexamethylene diisocyanate, isomers of bis(4,4'-isocyanatocyclohexyl)methane, a mixture of isomers of bis (4,4'-isocyanatocyclohexyl)methane with any isomer content, 1,4-cyclohexylene diisocyanate, 1,4-phenylene diisocyanate, 2,4-tolylene diisocyanate, 2,6-tolylene diisocyanate, 1,5-naphthylene diisocyanate, diphenylmethane-2,2'-diisocyanate, diphenylmethane-2,4'-diisocyanate, diphenylmethane-4,4'-diisocyanate, 1,3-bis(2-isocyanato-prop-2-yl)-benzene, 1,4-bis(2-isocyanatoprop-2-yl)-benzene (TMXDI), 1,3-bis(isocyanatomethyl)benzene (XDI) and alkyl 2,6-diisocyanatohexanoate with a C1-C8 alkyl group (lysine diisocyanate), and most preferably one or more of 1,6-hexylene diisocyanate (HDI), isophorone diisocyanate (IPDI), isomers of bis(4,4'-isocyanatocyclohexyl) methane and a mixture of isomers of bis(4,4'-isocyanatocyclohexyl)methane.

The polyisocyanate with isocyanate functionality of 2 may also be a derivative of the above-mentioned polyisocyanate with uretdione, isocyanurate, urethane, allophanate, biuret, imino-oxadiazinedione and/or oxadiazinetrione structures. The derivative has two or more free isocyanate groups.

The polyisocyanate containing more than 2 NCO groups per molecule is preferably one or more of 4-isocyanatomethyloctane 1,8-diisocyanate (nonane triisocyanate) and triphenylmethane-4,4',4"-triisocyanate.

The polymeric polyol of component A2) may be that commonly used in the preparation of aqueous polyurethane dispersions, preferably one or more of polyester polyols, polyacrylate polyols, polyurethane polyols, polycarbonate polyols, polyether polyols, polyester polyacrylate polyols, polyurethane polyacrylate polyols, polyurethane polyester polyols, polyurethane polyether polyols, polyurethane polycarbonate polyols, and polyester polycarbonate polyols.

The polyester polyols are preferably polycondensates of a diol and optionally a tri- and tetra-ol with a dicarboxylic acid and optionally a tri- and tetra-carboxylic acid or a hydroxycarboxylic acid or a lactone. When the average functionality of the diol and optionally the tri- and tetra-ol is greater than 2, it may be also possible to use a monocarboxylic acid for polycondensation to form polyester polyols, said monocarboxylic acid being preferably benzoic acid and/or heptanoic acid.

The diol is preferably one or more of ethylene glycol, butylene glycol, diethylene glycol, triethylene glycol, polyalkylene glycols such as polyethylene glycol, 1,2-propanediol, 1,3-propanediol, 1,3-butanediol, 1,4-butanediol, 1,6-hexanediol and isomers thereof, neopentyl glycol and neopentyl glycol hydroxypivalate, and most preferably one or more of 1,6-hexanediol and isomers thereof, neopentyl glycol and neopentyl glycol hydroxypivalate.

The tri- and tetra-ol is preferably one or more of trimethylolpropane, glycerin, erythritol, pentaerythritol, trimethylolbenzene, and trihydroxyethyl isocyanurate.

The dicarboxylic acid is preferably one or more of phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid and 2,2-dimethylsuccinic acid. As the dicarboxylic acid, the corresponding anhydride may also be used as the acid source.

The lactone is preferably one or more of caprolactone, caprolactone homologs, butyrolactone and butyrolactone homologs, most preferably caprolactone.

The polycarbonate polyols have preferably a linear structure, are most preferably polycarbonate diols.

The polycarbonate diols preferably comprise 40% by weight to 100% by weight of hexanediol. The hexanediol is preferably 1,6-hexanediol and/or hexanediol derivatives. The hexanediol derivatives are preferably based on hexanediol and contains ester or ether groups in addition to the terminal hydroxyl groups, which may be obtainable by the reaction of hexanediol with excess caprolactone or by etherification of hexanediol itself to produce dihexanediol or trihexanediol.

The polyether polyols are preferably one or more of polytetramethylene glycol polyethers and products obtained by the addition of styrene oxide, ethylene oxide, propylene oxide, butylene oxide and/or epichlorohydrin onto di- or multifunctional starter molecules.

The polytetramethylene glycol polyethers are preferably obtained from tetrahydrofuran via cationic ring-opening polymerization.

The starter molecules are preferably one or more of water, butyl diethylene glycol, glycerin, diethylene glycol, trimethylolpropane, propylene glycol, sorbitol, ethylene diamine, ethylene glycol, triethanolamine and 1,4-butanediol.

The polymeric polyol of A2) comprises most preferably a polycarbonate polyol and a polybutylene glycol polyol. The amount of the polycarbonate polyol and polybutylene glycol polyol is preferably at least 50% by weight, more preferably 60% by weight, and most preferably at least 70% by weight, relative to the total weight of the polymeric polyol.

The amount of the polycarbonate polyol is preferably 20% by weight to 80% by weight, more preferably 25% by weight to 70% by weight, and most preferably 30% by weight to 65% by weight, relative to the total weight of the polycarbonate polyol and the polybutylene glycol polyol.

The amount of the polybutylene glycol polyol is preferably 20% by weight to 80% by weight, more preferably 30% by weight to 75% by weight, and most preferably 35% by weight to 70% by weight, relative to the total weight of the polycarbonate polyol and the polybutylene glycol polyol.

The hydroxyl-functional compound of A3) is preferably one or more of polyols having up to 20 carbon atoms, ester diols, and monofunctional or isocyanate-reactive hydroxyl-functional compounds.

The polyols having up to 20 carbon atoms are preferably one or more of ethylene glycol, diethylene glycol, triethylene glycol, 1,2-propanediol, 1,3-propanediol, 1,4-butylene glycol, 1,3-butanediol, cyclohexanediol, 1,4-cyclohexanedimethanol, 1,6-hexanediol, neopentyl glycol, hydroquinone dihydroxyethyl ether, bisphenol A (2,2-bis(4-hydroxyphenyl)propane), hydrogenated bisphenol A (2,2-bis(4-hydroxycyclohexyl)propane), trimethylolpropane, glycerin and pentaerythritol.

The ester diols are preferably one or more of α-hydroxybutyl ε-hydroxyhexanoate, ω-hydroxyhexyl γ-hydroxybutyrate, β-hydroxyethyl adipate and β-hydroxyethyl terephthalate.

The monofunctional or isocyanate-reactive hydroxyl-functional compounds are preferably one or more of ethanol, n-butanol, ethylene glycol monobutyl ether, diethylene glycol monomethyl ether, ethylene glycol monobutyl ether, diethylene glycol monobutyl ether, propylene glycol monomethyl ether, dipropylene glycol monomethyl ether, tripropylene glycol monomethyl ether, dipropylene glycol monopropyl ether, propylene glycol monobutyl ether, dipropylene glycol monobutyl ether, tripropylene glycol monobutyl ether, 2-ethylhexanol, 1-octanol, 1-dodecanol, 1-hexadecanol, 1,6-hexanediol, 1,4-butanediol, neopentyl glycol and trimethylolpropane, and most preferably one or more of 1,6-hexanediol, 1,4-butanediol, neopentyl glycol and trimethylolpropane.

The isocyanate-reactive hydrophilizing agent of A4) is preferably a compound containing at least one isocyanate-reactive group such as a hydroxyl group and at least one functional group such as $—COO\text{-}M^+$, $—SO^{3-}M^+$, $—PO(O^- M^+)_2$, wherein $M^+$ is preferably one or more of metal cations, $H^+$, $NH^{4+}$ and $NHR^{3+}$, and R is preferably one or more of $C_1$-$C_{12}$ alkyls, $C_5$-$C_6$ cycloalkyls and $C_2$-$C_4$ hydroxyalkyls. The above-mentioned functional groups are present in a pH-dependent dissociation equilibrium upon interacting with an aqueous medium and thereby may be negatively charged or neutral.

The isocyanate-reactive hydrophilizing agent of A4) is further preferably one or more of monohydroxy carboxylic acids, dihydroxy carboxylic acids, monohydroxy sulfonic acids, dihydroxy sulfonic acids, monohydroxy phosphonic acids, dihydroxy phosphonic acids and salts thereof, and most preferrably one or more of those containing carboxylate anions, carboxylic acid groups and sulfonate anions.

The amino-functional anionic hydrophilizing agent or amino-functional potentially anionic hydrophilizing agent of B1) is preferably a compound containing at least one functional group such as $—COO\text{-}M^+$, $—SO^{3-}M^+$, $—PO(O^-M^+)_2$, wherein $M^+$ is preferably one or more of metal cations, $H^+$, $NH^{4-}$ and $NHR^{3-}$, and R is preferably one or more of $C_1$-$C_{12}$ alkyls, $C_5$-$C_6$ cycloalkyls and $C_2$-$C_4$ hydroxyalkyls. The above-mentioned functional groups are present in a pH-dependent dissociation equilibrium upon interacting with an aqueous medium and thereby may be negatively charged or neutral.

The amino-functional compound of 32 g/mol-400 g/mol of B2) is preferably one or more of 1,2-ethylenediamine, 1,4-diaminobutane and isophoronediamine.

The aqueous polyurethane dispersion may be prepared by prepolymer mixing method, acetone method or melt dispersion method. The acetone method is preferably used.

In the acetone method, all or part of A1)-A4) are usually firstly introduced to prepare an isocyanate-functional prepolymer, which is optionally diluted with a solvent that is miscible with water but inert to isocyanate groups, and heated to 50° C.-120° C.

The solvent may be a conventional keto-functional aliphatic solvent, such as acetone and 2-butanone. The solvent can be added only at the beginning of the preparation, or an additional portion of the solvent may be added during the preparation as needed.

The solvent may also be one or more of xylene, toluene, cyclohexane, butyl acetate, methoxypropyl acetate, N-methylpyrrolidone, N-ethylpyrrolidone and a solvent containing ether or ester unit.

Any of components A1)-A4) not added at the beginning of the reaction are then metered in.

When preparing the isocyanate-functional prepolymer from components A1)-A4), the molar ratio of isocyanate groups to isocyanate-reactive groups is preferably 1.05-3.5, more preferably 1.2-3.0, most preferably 1.3-2.5.

The components A1)-A4) are partially or completely, preferably completely converted into the isocyanate-functional prepolymer.

The isocyanate-functional prepolymer obtained in step a) may be in a solid state or a liquid state.

If the obtained isocyanate-functional prepolymer has not been dissolved or is only partially dissolved, the prepolymer is further dissolved using an aliphatic ketone, such as acetone or 2-butanone.

In step b), the $NH_2$— and/or NH-functional component is partially or completely reacted with the residual isocyanate groups of the isocyanate-functional prepolymer. Chain extension or termination is preferably performed before dispersing into water.

The component IIa) and component IIb) may optionally be used alone or in mixture as diluted in water or diluted in solvent. The order of addition may be arbitrary.

Water-Dispersible Polyisocyanate

The water-dispersible polyisocyanate is preferably an aqueous formulation of an isocyanate group-containing compound. In a further preferred embodiment, the water-dispersible polyisocyanate does not comprise a hydroxyl group-containing polymer. The water-dispersible polyisocyanate can also be referred to as an aqueous formulation of a hydrophilized isocyanate.

The water-dispersible polyisocyanate can chemically react with the aqueous polyurethane dispersion and the surface of the object simultaneously, so that the film formed by the aqueous polyurethane dispersion can better adhere to the surface of the printed object, and the surface effect is optimized and the mechanical properties are enhanced.

Preferably, the water-dispersible polyisocyanate has at least one of the following characteristics:

an average isocyanate functionality of not less than 2.0;

an isocyanate group content of 5.0% by weight to 25.0% by weight (the molecular weight of the isocyanate group being 42); and comprising an anionic and/or non-ionic hydrophilizing component.

The isocyanate group content of the water-dispersible polyisocyanate is preferably 15% by weight to 22% by weight, relative to the total weight of the water-dispersible polyisocyanate.

The viscosity of the water-dispersible polyisocyanate is preferably 1000 mPa·s to 8000 mPa·s.

The amount of the solid constituent of the water-dispersible polyisocyanate is preferably 4% by weight to 6% by weight, relative to the total weight of the treating agent.

The appropriate content of the water-dispersible polyisocyanate in the treating agent can result in a cross-linking density of the water-dispersible polyisocyanate and the aqueous polyurethane dispersion in an appropriate range, and slow down the tendency of the rising viscosity of the aqueous polyurethane dispersion, thereby reducing the elastic loss and improving the surface effect of the object, that is, improving the appearance of the object.

Production of an Object by Means of an Additive Manufacturing Method

Production of an object by means of an additive manufacturing method comprises the following steps:

applying a layer composed of particles containing the construction material to the target surface;

introducing energy to the selected part of the layer corresponding to the cross section of the object, such that the particles in the selected part are bonded; and

repeating the steps of applying and introducing energy for a multitude of layers, such that the bonded parts of the adjacent layers become bonded in order to form the object.

The step of introducing energy to the selected part of the layer corresponding to the cross section of the object such that the particles in the selected part are bonded comprises: irradiating the selected part of the layer corresponding to the cross section of the object with an energy beam, such that the particles in the selected part are bonded.

The step of introducing energy to the selected part of the layer corresponding to the cross section of the object such that the particles in the selected part are bonded comprises:

applying a liquid to the selected part of the layer corresponding to the cross section of the object, wherein the liquid increases the energy absorption in the area of the layer in contact with it, compared with that in the area not in contact with it; and irradiating the layer, such that the particles in the area of the layer in contact with the liquid are bonded to each other, and the particles in the area of the layer not in contact with the liquid are not bonded to each other.

At Least Partially Coated Object

The tensile strength of the at least partially coated object is preferably greater than 8.5 MPa, most preferably 10 MPa to 14 MPa, measured according to DIN53504-S1.

The elongation at break of the at least partially coated object is preferably greater than 300%, most preferably greater than 300% and not more than 400%, measured according to DIN53504-S1.

The surface effect of the at least partially coated object is preferably 5.

Article

An article comprises the at least partially coated object obtained according to the method according to the present invention.

The article is preferably selected from models, ornaments, work fixtures or shoe materials.

EXAMPLES

Unless defined otherwise, all technical and scientific terms used herein have the same meaning as commonly understood by those skilled in the art. When the definition of a term in this specification conflicts with the meanings commonly understood by those skilled in the art, the definition described herein shall apply.

Unless indicated otherwise, all numbers expressing quantities of ingredients, reaction conditions and the like used in the specification and claims are to be understood as being modified by the wording "about". Accordingly, unless indicated to the contrary, the numerical parameters set forth herein are approximations that can vary depending upon the desired properties to be obtained.

The wording "and/or" used herein refers to one or all of the cited elements.

The wordings "include" and "comprise" used herein cover the presence of the mentioned elements alone and the presence of other elements not mentioned in addition to the mentioned elements.

All percentages in the present invention are weight percentages, unless otherwise stated.

The analysis and measurement in the present invention are performed at 23° C., unless otherwise stated.

Unless otherwise indicated, the wordings "a", "an", and "the" used in the specification are intended to include "at least one" or "one or more". For example, the wording "a component" refers to one or more components. Therefore, more than one component may be considered and may be adopted or used in the implementation of the embodiments.

The solid content of the dispersion is measured using an HS153 moisture analyzer from Mettler Toledo in accordance with DIN-EN ISO 3251 at 1 g/1 h/125° C.

The viscosity is measured under the condition of spindle L 2/30 rpm in accordance with DIN 53019.

Unless otherwise specified, all liquid treating agents contain the water-soluble siloxane treating agent BYK345 in a mass fraction of 0.05%, except for the treating agent containing only an organic solvent.

Raw Materials and Agents

Dispercoll U 58/1: An aqueous polyurethane dispersion based on hexamethylene diisocyanate and polybutylene adipate polyol with a solid content of 50±2% by weight, available from Covestro.

Dispercoll U 58/1 plus: An aqueous polyurethane dispersion based on hexamethylene diisocyanate and polybutylene adipate polyol with a solid content of 50±2% by weight, available from Covestro.

Impranil DL 1537: An aqueous polyurethane dispersion based on isophorone diisocyanate, hexamethylene diisocyanate and polybutylene adipate polyol with a solid content of 59±2% by weight, available from Covestro.

Impranil DAH: An aqueous polyurethane dispersion based on diphenylmethane diisocyanate and polyether polyol with a solid content of 36±1% by weight, available from Covestro.

Bayhydur ultra 3100: A prepolymer based on hexamethylene diisocyanate (HDI) trimer and polyether with a solid content of 100% by weight, an isocyanate group content of 17.4±0.5% by weight, and a viscosity of about 2500 mPa·s (23° C.), available from Covestro.

Bayhydur ultra 307: An anionically modified prepolymer based on hexamethylene diisocyanate (HDI) trimer and polyether with a solid content of 100% by weight, an isocyanate group content of 20.3±0.5% by weight, and a viscosity of about 6000 mPa·s (23° C.)), available from Covestro.

Luvosint X92A-1: Thermoplastic polyurethane powder with a glass transition temperature of −13.6° C. (measured according to ISO 6721-1), melt volume rate of 18 cm³/min (measured according to ISO1133, MVR 190° C./2.16 kg).

Evaluation of Performance

Elongation at break: The elongation at break is evaluated on samples of thermoplastic polyurethane objects printed by additive manufacturing method according to the method in DIN53504-S1. When the elongation at break is greater than 300%, the objects have sufficient toughness, and are used in a wide range of applications such as shoe midsoles, insoles, and grasping palms, etc.

Tensile strength (also called as breaking strength): The tensile strength is evaluated on samples of thermoplastic polyurethane objects printed by additive manufacturing method according to the method in DIN53504-S1. When the tensile strength of the objects is greater than 8.5 MPa, they can meet the relevant application requirements.

Surface effect: The surface effect of the samples of the thermoplastic polyurethane objects printed by the additive manufacturing method before and after being coated with the treating agent is evaluated with a grade from 1 to 5 point. A grade of 1 point means that the sample surface has very rough and uncomfortable tactile property, and the surface is porous and the powder falls off. A grade of 2 points means that the sample surface is very rough but the no powder falls off. A grade of 3 points means that the sample surface is slightly rough and small holes and pores exist thereon. A grade of 4 points means that the sample surface is smooth but has local defects, and the coating on the sample surface is easy to be torn off. A grade of 5 points means that the sample surface is smooth without local defects, and the coating on the sample surface is not easy to be torn off. The surface effect with a grade of 5 points is regarded as qualified.

Production of Objects by Means of an Additive Manufacturing Method

The objects are prepared by laser sintering additive manufacturing method (SLS). The construction material is Luvosint X92A-1. The additive manufacturing method is carried out by using an equipment ZS-500 from Anhui Zhuorui with the following equipment parameters: powder surface temperature of 90° C., scanning speed of 5000 mm/s, laser power of 28 W, hatch distance of 0.2 mm, and layer height of 0.1 mm. The objects are trimmed according to DIN53504-S1. Shore A hardness (ISO 868) of the object is 88.

Table 1 shows the composition of the treating agents, the coating condition for the objects manufactured by the additive manufacturing method, and the elongation at break, tensile strength and surface effect of the coated objects of Examples 1-10 of the present invention and Comparative Examples 1-15.

Coating of the Objects of Examples 1-10 and Comparative Examples 1-15

Comparative Example 1: The object prepared by means of the additive manufacturing method was placed in a circulating air drying oven, heat-treated at 80° C. for 2 hours, and taken out and stored at 25° C. and 50% humidity for 3 days. The performance of the object was evaluated.

Comparative Example 2: The object prepared by means of the additive manufacturing method was impregnated in the dimethylformamide (DMF) solvent, and taken out after 5 seconds. The object was placed in a circulating air drying oven, and heat-treated at 80° C. for 2 hours. It was found that there was still a small amount of DMF solvent remaining on the surface of the object. The DMF solvent on the surface of the object was completely removed, after the heat treatment time was extended to 5 hours. The object was taken out and stored at 25° C. and 50% humidity for 3 days. The performance of the object was evaluated.

Comparative Examples 3-15 and Examples 1-10: The object prepared by means of the additive manufacturing method was impregnated in a container containing the treating agent shown in Table 1. The container was placed in the negative pressure environment shown in table 1 at 10° C.-30° C. for several minutes, and take out and placed at 10° C.-30° C. and under normal pressure. Then the object was taken out and placed in a circulating air drying oven. The object was heat-treated according to the heat treatment temperature shown in table 1 for 2 hours, then taken out and stored at room temperature for 3 days. The coated object was evaluated for mechanical properties and surface effect.

TABLE 1

| | Coated objects of Examples 1-10 and Comparative Examples 1-15 | | | | |
|---|---|---|---|---|---|
| | Treating agent component | | | | |
| | Aqueous polyurethane dispersion | | Water-dispersible polyisocyanate | | Deionized water/ weight/g |
| | Component | Weight/ g | Component | Weight/ g | |
| Comp. Ex. 1 | — | | — | | — |
| Comp. Ex. 2 | — | | — | | — |
| Comp. Ex. 3 | Dispercoll U 58/1 | 95 | Bayhydur ultra 307 | 5 | — |
| Comp. Ex. 4 | Impranil DAH | 95 | Bayhydur ultra 307 | 5 | — |
| Comp. Ex. 5 | — | 0 | Bayhydur ultra 307 | 5 | 95 |
| Comp. Ex. 6 | Dispercoll U 58/1 plus | 100 | — | — | — |
| Ex. 1 | Dispercoll U 58/1 plus | 95 | Bayhydur ultra 307 | 5 | — |
| Ex. 2 | Impranil DL 1537 | 95 | Bayhydur ultra 307 | 5 | — |
| Ex. 3 | Dispercoll U 58/1 plus | 95 | Bayhydur ultra 3100 | 5 | — |
| Comp. Ex. 7 | Dispercoll U 58/1 plus | 97 | Bayhydur ultra 307 | 3 | — |
| Ex. 4 | Dispercoll U 58/1 plus | 80 | Bayhydur ultra 307 | 5 | 15 |
| Ex. 5 | Dispercoll U 58/1 plus | 95 | Bayhydur ultra 307 | 5 | — |
| Ex. 6 | Dispercoll U 58/1 plus | 95 | Bayhydur ultra 307 | 5 | — |
| Comp. Ex. 8 | Dispercoll U 58/1 plus | 95 | Bayhydur ultra 307 | 5 | — |
| Comp. Ex. 9 | Dispercoll U 58/1 plus | 95 | Bayhydur ultra 307 | 5 | — |
| Ex. 7 | Dispercoll U 58/1 plus | 95 | Bayhydur ultra 307 | 5 | — |
| Ex. 8 | Dispercoll U 58/1 plus | 95 | Bayhydur ultra 307 | 5 | — |
| Comp. Ex. 10 | Dispercoll U 58/1 plus | 95 | Bayhydur ultra 307 | 5 | — |
| Ex. 9 | Dispercoll U 58/1 plus | 95 | Bayhydur ultra 307 | 5 | — |
| Comp. Ex. 11 | Dispercoll U 58/1 plus | 95 | Bayhydur ultra 307 | 5 | — |
| Ex. 10 | Dispercoll U 58/1 plus | 95 | Bayhydur ultra 307 | 5 | — |
| Comp. Ex. 12 | Dispercoll U 58/1 plus | 95 | Bayhydur ultra 307 | 5 | — |
| Comp. Ex. 13 | Impranil DL 1537 | 85 | Bayhydur ultra 307 | 5 | 10 |
| Comp. Ex. 14 | Dispercoll U 58/1 | 90 | Bayhydur ultra 307 | 5 | 5 |
| Comp. Ex. 15 | Impranil DL 1537 | 90 | Bayhydur ultra 307 | 10 | — |

| | Viscosity of the treating agent/ mPa · s |
|---|---|
| Comp. Ex. 1 | — |
| Comp. Ex. 2 | — |
| Comp. Ex. 3 | 820 |
| Comp. Ex. 4 | 485 |
| Comp. Ex. 5 | — |
| Comp. Ex. 6 | 478 |
| Ex. 1 | 525 |
| Ex. 2 | 278 |
| Ex. 3 | 530 |
| Comp. Ex. 7 | 510 |
| Ex. 4 | 117 |
| Ex. 5 | 525 |
| Ex. 6 | 525 |
| Comp. Ex. 8 | 525 |
| Comp. Ex. 9 | 525 |
| Ex. 7 | 525 |
| Ex. 8 | 525 |
| Comp. Ex. 10 | 525 |
| Ex. 9 | 525 |
| Comp. Ex. 11 | 525 |
| Ex. 10 | 525 |
| Comp. Ex. 12 | 525 |
| Comp. Ex. 13 | 81 |
| Comp. Ex. 14 | 617 |
| Comp. Ex. 15 | 405 |

| | Coating conditions | | | Properties of the coated object | | |
|---|---|---|---|---|---|---|
| | Negative pressure/ mbar | Time of negative pressure environment/ min | Temperature of heat treatment/° C. | Tensile Strength/ MPa | Elongation at break/% | Surface effect |
| Comp. Ex. 1 | — | — | — | 6.1 | 240 | 1 |
| Comp. Ex. 2 | — | — | 80 | 8.6 | 304 | 5 |
| Comp. Ex. 3 | 100 | 10 | 80 | 9.4 | 322 | 4 |
| Comp. Ex. 4 | 100 | 10 | 80 | 8.9 | 283 | 3 |
| Comp. Ex. 5 | 100 | 10 | 80 | 7.5 | 274 | 3 |
| Comp. Ex. 6 | 100 | 10 | 80 | 7.8 | 281 | 4 |
| Ex. 1 | 100 | 10 | 80 | 12.2 | 358 | 5 |
| Ex. 2 | 100 | 10 | 80 | 11 | 342 | 5 |
| Ex. 3 | 100 | 10 | 80 | 10.6 | 330 | 5 |
| Comp. Ex. 7 | 100 | 10 | 80 | 8.4 | 282 | 5 |
| Ex. 4 | 100 | 10 | 80 | 10.1 | 325 | 5 |
| Ex. 5 | 100 | 5 | 80 | 12.6 | 357 | 5 |

TABLE 1-continued

| Coated objects of Examples 1-10 and Comparative Examples 1-15 | | | | | | |
|---|---|---|---|---|---|---|
| Ex. 6 | 100 | 3 | 80 | 12.5 | 352 | 5 |
| Comp. Ex. 8 | 100 | 1 | 80 | 8.5 | 281 | 5 |
| Comp. Ex. 9 | 50 | 3 | 80 | 12.5 | 355 | 4 |
| Ex. 7 | 500 | 3 | 80 | 10.4 | 334 | 5 |
| Ex. 8 | 800 | 3 | 80 | 10.1 | 325 | 5 |
| Comp. Ex. 10 | 900 | 3 | 80 | 7.8 | 285 | 5 |
| Ex. 9 | 100 | 10 | 70 | 12.5 | 355 | 5 |
| Comp. Ex. 11 | 100 | 10 | 50 | 8.3 | 275 | 5 |
| Ex. 10 | 100 | 10 | 90 | 12.1 | 349 | 5 |
| Comp. Ex. 12 | 100 | 10 | 100 | 11.8 | 317 | 3 |
| Comp. Ex. 13 | 100 | 10 | 80 | 8.5 | 289 | 3 |
| Comp. Ex. 14 | 100 | 10 | 80 | 9.6 | 337 | 4 |
| Comp. Ex. 15 | 100 | 10 | 80 | 9.7 | 281 | 4 |

The viscosity of the treating agent of Comparative Example 3 was 820 mPa·s, and the surface effect of the object coated thereby was unqualified.

The amount of the solid constituent of Impranil DAH contained in the treating agent of Comparative Example 4 was 33.5% by weight, based on the total weight of the treating agent. The elongation at break of the object coated thereby was low, and the surface effect was unqualified.

The treating agent of Comparative Example 5 comprised no aqueous polyurethane dispersion. The object coated thereby had low tensile strength and low elongation at break, and the surface effect was unqualified.

The treating agent of Comparative Example 6 comprised no water-dispersible polyisocyanate. The object coated thereby had low tensile strength and low elongation at break, and the surface effect was unqualified.

The amount of the solid constituent of Bayhydur ultra307 contained in the treating agent of Comparative Example 7 was 3% by weight, based on the total weight of the treating agent. The object coated thereby had low tensile strength and low elongation at break.

In the coating method of Comparative Example 8, the time of negative pressure environment was 1 minute. The object coated thereby had low tensile strength and low elongation at break.

The negative pressure in the coating method of Comparative Example 9 was 50 mbar. The surface effect of the object coated thereby was unqualified.

The negative pressure in the coating method of Comparative Example 10 was 900 mbar. The object coated thereby had low tensile strength and low elongation at break.

The heat treatment temperature in the coating method of Comparative Example 11 was 50° C. The object coated thereby had low tensile strength and low elongation at break.

The heat treatment temperature in the coating method of Comparative Example 12 was 100° C. The surface effect of the object coated thereby was unqualified.

The viscosity of the treating agent of Comparative Example 13 was 81 mPa·s. The object coated thereby had low tensile strength and low elongation at break, and the surface effect was unqualified.

The viscosity of the treating agent of Comparative Example 14 was 617 mPa·s. The surface effect of the object coated thereby was unqualified.

The amount of the solid constituent of the water-dispersible polyisocyanate contained in the treating agent of Comparative Example 15 was 10% by weight, based on the total weight of the treating agent. The object coated thereby had low elongation at break, and the surface effect was unqualified.

Those skilled in the art will readily understand that the present invention is not limited to the foregoing details, and can be implemented in other specific forms without departing from the spirit or main characteristics of the present invention. Therefore, the examples should be regarded as illustrative rather than restrictive from any point of view, so that the scope of the present invention is indicated by the claims rather than the foregoing description. Therefore, any change shall be regarded as belonging to the present invention, as long as it falls into the meaning and scope of equivalents of the claims.

The invention claimed is:

1. A method for producing an at least partially coated object, comprising:
   bringing the object completely or partly into contact with a treating agent;
   leaving the object at 10° C.-30° C. and 100 mbar-800 mbar for 3-10 minutes; and
   heat-treating the object at a temperature of 70° C.-90° C. after returning to one standard atmospheric pressure;
   wherein the object is produced from a construction material by means of an additive manufacturing method, and the construction material comprises a thermoplastic polyurethane;
   and wherein the treating agent comprises an aqueous polyurethane dispersion and a water-dispersible polyisocyanate, and the viscosity of the treating agent is 100 mPa·s-550 mPa·s, measured under the condition of spindle L 2/30 rpm according to standard DIN 53019; and wherein the amount of the solid constituent of the aqueous polyurethane dispersion is 36% by weight to 70% by weight, and the amount of the solid constituent of the water-dispersible polyisocyanate is 4% by weight to 8% by weight, relative to the total weight of the treating agent.

2. The method according to claim 1, wherein the additive manufacturing method is a powder bed fusion method.

3. The method according to claim 1, wherein the aqueous polyurethane dispersion is obtained by means of
   a. preparing an isocyanate-functional prepolymer A) by the reaction of the components comprising
   A1) an organic polyisocyanate,
   A2) a polymeric polyol with a number average molecular weight of 400 g/mol-8000 g/mol and a hydroxyl functionality of 1.5-6,
   A3) optionally a hydroxyl-functional compound with a molecular weight of 62 g/mol-399 g/mol, and optionally an ethylenically unsaturated compound, and
   A4) optionally an isocyanate-reactive hydrophilizing agent selected from one or more of anionic hydrophilizing agents, potentially anionic hydrophilizing agents, and non-ionic hydrophilizing agents;

b. reacting the free isocyanate groups of the isocyanate-functional prepolymer A) completely or partly with the isocyanate-reactive component B) comprising B1) an amino-functional anionic or potentially anionic hydrophilizing agent and B2) optionally an amino-functional compound with a molecular weight of 32 g/mol-400 g/mol to obtain a polyurethane polymer; and c. introducing water before, during, or after step b.

4. The method according to claim 1, wherein the water-dispersible polyisocyanate has at least one of the following characteristics:

an average isocyanate functionality of not less than 2.0;

an isocyanate group content of 5.0% by weight to 25.0% by weight; and comprising an anionic and/or non-ionic hydrophilizing component.

5. The method according to claim 1, wherein the production of the object by means of an additive manufacturing comprises:

applying a layer composed of particles containing the construction material to the target surface;

introducing energy to the selected part of the layer corresponding to the cross section of the object, such that the particles in the selected part are bonded; and repeating the steps of applying and introducing energy for a multitude of layers, such that the bonded parts of the adjacent layers become bonded in order to form the object.

6. The method according to claim 5, wherein introducing energy to the selected part of the layer corresponding to the cross section of the object such that the particles in the selected part are bonded comprises irradiating the selected part of the layer corresponding to the cross section of the object with an energy beam, such that the particles in the selected part are bonded.

7. The method according to claim 5, wherein introducing energy to the selected part of the layer corresponding to the cross section of the object such that the particles in the selected part are bonded comprises:

applying a liquid to the selected part of the layer corresponding to the cross section of the object, wherein the liquid increases the energy absorption in the area of the layer in contact with it, compared with that in the area not in contact with it; and irradiating the layer, such that the particles in the area of the layer in contact with the liquid are bonded to each other, and the particles in the area of the layer not in contact with the liquid are not bonded to each other.

8. The method according to claim 1, wherein the thermoplastic polyurethane is in a form of powder.

9. The method according to claim 1, wherein the thermoplastic polyurethane has at least one of the following characteristics:

elongation at break of more than or equal to 50%, measured in the tensile test according to DIN 53504; and compression set of less than or equal to 10% as the absolute value after 25% compression (according to DIN 53517).

10. An at least partially coated object obtained by a method according to claim 1.

* * * * *